US006632902B2

(12) United States Patent
Lahijani

(10) Patent No.: US 6,632,902 B2
(45) Date of Patent: Oct. 14, 2003

(54) PROCESS FOR ROTOMOLDING WITH MELT-EXTRUDED TFE/PAVE COPOLYMER

(75) Inventor: Jacob Lahijani, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 126 days.

(21) Appl. No.: 09/864,467

(22) Filed: May 24, 2001

(65) Prior Publication Data

US 2002/0011692 A1 Jan. 31, 2002

(51) Int. Cl.[7] ............ B29C 51/00; C08F 214/26; C08F 214/18
(52) U.S. Cl. .......... 526/250; 264/239; 264/299; 264/310; 264/312; 526/247
(58) Field of Search ............... 526/250, 247; 427/183; 264/310, 312

(56) References Cited

U.S. PATENT DOCUMENTS 3,184,525 A    5/1965   Brandt
3,528,954 A    9/1970   Carlson
4,380,618 A    4/1983   Khan et al.
4,714,756 A   12/1987   Buckmaster
4,743,658 A    5/1988   Imbalzano et al.
5,093,409 A    3/1992   Buckmaster
5,677,404 A   10/1997   Blair
5,760,151 A    6/1998   Aten et al.
6,287,632 B1 * 9/2001   Nishio et al. ............ 427/183

FOREIGN PATENT DOCUMENTS

| EP | 0222945 A1 | 5/1987 |
| EP | 0226668 A1 | 7/1987 |
| JP | 10017621 | 1/1998 |
| JP | 2001-113541 | 4/2001 |
| WO | 94/05712 | 3/1994 |
| WO | 00/44797 | 8/2000 |

OTHER PUBLICATIONS

The Encyclopedia of Polymer Science and Engineering, vol. 14, p. 659, John Wiley & Sons Inc., New York, 1988.

* cited by examiner

Primary Examiner—Fred Zitomer

(57) ABSTRACT

A process for rotomolding using novel melt-extruded melt-fabricable TFE copolymer minicubes, wherein at least 80% of the minicubes are in the size range of 200 to 1200 μm.

8 Claims, No Drawings

US 6,632,902 B2

PROCESS FOR ROTOMOLDING WITH MELT-EXTRUDED TFE/PAVE COPOLYMER

FIELD OF THE INVENTION

This invention relates to a process for rotomolding tetrafluoroethylene/perfluoro(alkyl vinyl ether) (TFE/PAVE) copolymer with pellets prepared by melt-extrusion.

BACKGROUND OF THE INVENTION

Rotomolding, which as used here includes rotocasting and rotolining, is a melt-fabricable tetrafluoroethylene copolymer processing method especially suited for making large hollow articles in a heated rotating mold. In the case of rotocasting, after cooling of the mold, the hollow article is removed from the mold. In the case of rotolining, the hollow article remains as a lining for the mold. Thus, the mold can be a capped pipe tee, and the hollow article forms a lining for the tee. The rotomolding process is described in The Encyclopedia of Polymer Science and Engineering, Vol. 14, p. 659, John Wiley & Sons Inc., New York, 1988. Polymer for rotomolding is in the form of powder, sometimes called beads or granules, of roughly spherical shape. Although particle sizes up to 3000 $\mu$m are disclosed in the literature, in practice, the particle sizes are typically less than about 500 $\mu$m in size. Conventional standard melt-extruded polymer cubes, sometimes called pellets of the sort used as a feed for melt extrusion or injection molding have not been suitable for rotomolding, because the resultant rotomolded article has a rough interior, uneven thickness and contains bubbles within its thickness. In an attempt to avoid these deficiencies, rotomolding powder has been made by other processes, such as agglomerating polymer particles obtained from polymerization into granules as disclosed in U.S. Pat. No. 4,714,756 relating to the preparation of tetrafluoroethylene/perfluoro(alkyl vinyl ether) (TFE/PAVE) copolymer rotomolding powder. Because polymers such as TFE/PAVE are used both in melt extrusion and in rotomolding, and these require the polymer to be in different forms, separate polymer preparation processes and equipment must be maintained. Furthermore, powders must be classified to remove fines or dust. Settling and segregation in storage and shipping may require remixing to ensure uniform size distribution. Static electricity can make handling difficult. In other words, while the use of powder instead of melt-extruded cubes for rotomolding has produced a better rotomolded product, the use of the powder has had the disadvantage of increasing expense.

There is a need for a rotomolding process that does not require the use of polymer in powder form.

SUMMARY OF THE INVENTION

The present invention satisfies this need by providing smaller size melt-extruded cubes of melt-fabricable TFE copolymer. In particular the size range of the "minicubes" is that at least 80% are in the range of 200 to 1200 $\mu$m.

The process of the present invention is carrying out the rotomolding using these copolymer minicubes to form a hollow article of the copolymer.

DETAILED DESCRIPTION

Melt-fabricable TFE copolymer used in the present invention is preferably partially crystalline, and the preferred comonomers are at least one monomer selected from the group consisting of perfluoroolefin having 3 to 6 carbon atoms, preferably hexafluoropropylene (HFP); olefins, preferably ethylene and propylene, more preferably ethylene; and perfluoro(alkyl vinyl ether) (PAVE), wherein the alkyl group contains 1 to 8 carbon atoms, preferably 1 to 3 carbon atoms. The more preferred copolymers are perfluorinated. Among the perfluorinated copolymers are terpolymers of TFE/HFP/perfluoro(ethyl vinyl ether), such as that disclosed in U.S. Pat. No. 5,677,404. The most preferred copolymers are TFE/PAVE copolymers such as disclosed in U.S. Pat. No. 3,528,954. Preferred forms of TFE/PAVE copolymers are disclosed in U.S. Pat. No. 5,760,151, wherein the perfluoroalkyl group is ethyl (PEVE), and the copolymer contains at least about 3 wt %, preferably at least about 5 wt %, and more preferably at least about 7 wt % of the PVE comonomer, preferably the PEVE copolymer. The PEVE copolymers are called TFE/PEVE copolymers.

The rotomolding process involves the steps of feeding the copolymer minicubes described above to the hollow mold, rotating the mold, heating the mold while it is rotating, the temperature being above the melting point of the copolymer, with the heating and rotating being carried out for sufficient time for the minicubes to fuse together in the interior shape of the mold to form a hollow article conforming to this interior shape, and cooling the mold and the article contained in it. The rotation of the mold causes the minicubes to tumble over one another and the heating of the mold eventually causes these minicubes to soften, flow, and then fuse together. The only force exerted upon these minicubes is the centrifugal force resulting from rotation. The rotation of the mold is multiaxial, so that the entire exposed interior surface of the mold is covered with the molten copolymer. It is therefore important that the copolymer be sufficiently flowable at the temperature used so as to form the molded hollow article. Thus, the melt flow rate (MFR) of the copolymer is preferably in the range of about 2 to about 100 (g/min), more preferably about 5 to about 50, and even more preferably about 10 to about 5.

The melt-extruded particle described in this invention is referred to hereinafter as "minicube", although as will be shown, it is not cubic in shape. Minicube is made by melting the TFE copolymer in a single screw or twin screw extruder, and extruding the melted polymer through a multihole die to yield minicubes in the form of small cylinders approximately 200 to 1200 $\mu$m in diameter, preferably about 500 to about 1200 $\mu$m in diameter, and melt-cutting the copolymer as it exits the die into lengths of about 200 to about 2000 $\mu$m, preferably about 500 to about 1500 $\mu$m. It has been found however, that cutting to these short lengths also produces longer cubes, e.g. up to 3000 $\mu$m, in a minor proportion (<30%). The small diameter of the minicubes, however, still enables the melt-extruded cubes to have an overall small size as determined by sieving as described hereinafter. The minicubes, insofar as dimensions are concerned, are used in the rotomolding process as-extruded and cut into lengths; they are unground, i.e. they are not subjected to comminution to smaller sizes.

To reduce the effect of shear on melted polymer, it has been found useful to put a melt pump, an example of which is a gear pump, between the extruder and the die. By this means, the pressure necessary to extrude the melt through the die is generated by the melt pump, in which shear forces are less than would be experienced if the extruder alone were used to generate the necessary pressure. Excessive shear can cause copolymer degradation and thus adversely affect copolymer properties. An example of a suitable die is one having about 700 holes (extrusion orifices), each about 30 mils (760 $\mu$m) in diameter. Because of the phenomenon known as "die swell" or "extrudate swell", the minicubes so produced have a larger diameter than the extrusion orifices, whereby for a given minicube diameter and orifice selected to provide such diameter, there will be some variation in the minicube diameters obtained. The cylindrical shape of the minicubes may also vary, from perfect cylinders to cylinders having slightly flattened sides or elliptical cross-section. The diameter of the minicube is considered to be the longest dimension normal, i.e. perpendicular, to the length of the minicube.

The 760 $\mu$m diameter orifice provides minicubes having an average diameter of about 1000 $\mu$m. The extrudate is cut into short lengths. One means of doing this is through use of a conventional cutter operating across the outer face of the extrusion die, the cut minicubes falling into water for cooling. The preferred length is in the range of about 200 to about 2000 $\mu$m, more preferably about 500 to about 2000 $\mu$m. There will also be some variation in the minicube length for a given cutting length. The variability of the minicube diameter and length is greater than for the melt extrusion of standard size cubes, and it has been found that this greater size variability of the minicubes compared is an advantage in rotomolding applications, by providing much smooth, bubble-free hollow articles of more uniform cross-section (wall thickness) in the rotomolding process. It is believed that the broader size distribution contributes to better packing of the minicubes on the surface of the mold, although the tumbling of the minicubes prior to fusing together distinguishes this packing effect from packing systems where no rotation or heating to melt is involved. Minicubes should have a variability, as measured by the coefficient of variation (as hereinafter defined) of their weight, length, width, or height, of at least about 25%, preferably at least about 35%, more preferably at least about 45%, and most preferably at least about 50%.

For comparison, the standard die for making conventional cube uses a 25 to 200 hole die, the holes of which are about 2500 $\mu$m (100 mils) in diameter, and produces cleanly cut cubes ranging from about 3000 to about 4000 $\mu$m in diameter, about 1000 to about 2000 $\mu$m in length, and of regular geometry, i.e. they are right cylinders.

The size of the minicubes of the present invention can be measured by screening, in which case either the minicube diameter or length may be small enough for the minicube to pass through a given screen size, while the screen which retains the minicubes will have apertures generally larger than either the diameter of length of the minicube. However the minicube size range is set, there may be some variation of length or diameter outside of this range because of the variability in the diameters and lengths of the minicubes made under the same conditions, together with the variability resulting from screen sizing. Thus for a given size range, 20% or less of the minicubes will be slightly outside of this range. The preferred size range for the minicubes of the present invention is about 500 to about 1200 $\mu$m, more preferably about 600 to about 1000 $\mu$m, wherein at least about 90% of the minicubes are within this range and, even more preferably, about 850 to about 1000 $\mu$m wherein at least at least about 70%, more preferably at least about 80%, of the minicubes fall within this range. The minicube diameter is the limiting dimension for the minicube size range. If the diameter is small enough, the minicube will pass through the screen having openings slightly greater than the maximum size desired. In that case, the minicube length can be greater than these screen openings and the minicubes will still pass through the openings because of the small diameters of the minicubes.

With respect to the desired stability of the TFE copolymer used in the present invention, it is known in the art that fluoropolymers can contain unstable end groups such as —COOH, —CH$_2$OH, —CO$_2$CH$_3$, —COF, and —CF=CF$_2$ depending on ingredients used in the polymerization process used to make the TFE copolymer (U.S. Pat. No. 4,675,380). These unstable end groups are thermally and/or hydrolytically unstable. This is what is meant by the term "unstable end groups". They have a tendency to cause bubbles or voids upon melt fabrication. These voids can be detrimental to the physical or electrical properties of fabricated articles. Because melt processing can increase the concentration of unstable end groups in perfluoropolymers, it is preferred to fluorinate the minicubes made from such polymers according to this invention before using them in rotomolding applications. The unstable end group concentration in the polymer making up the minicubes should be less than about 80, preferably less than about 10, more preferably less than 6 unstable end groups per million carbon atoms in the polymer. Unstable end group identity and measurement is disclosed in U.S. Pat. No. 4,743,658 as is the process for fluorination which is applied to the minicubes of the present invention in the same manner as disclosed for the granules in the patent.

Copolymers of this invention that are not perfluorinated, for example the copolymer of TFE and ethylene (ETFE), can be processed at lower temperatures where the decomposition rates of the unstable end groups described above are slower and the resulting defects in the molded article are fewer or not present at all. An indication of the processibility of ETFE at lower temperatures than are possible with perfluoropolymers is seen in ASTM D 1238. ETFE flow rates are measured at 297° C. in the standard extrusion plastometer (melt indexer), while perfluoropolymers such as TFE/HFP (FEP) and TFE/PAVE (PFA) are measured at 372° C.

Test Methods

Particle size is determined according to ASTM D 1921-96. Sieves selected from U.S. Standard Sieves Nos. 14, 16, 18, 20, 30, 35,40, 50, and 60 are used for the minicube samples. Sieve Nos. 20, 25, 30, 35, 40, 45, and 50 are used for the rotomolding powder sample. The sieves are assembled so that the size of the openings decrease in sequence from the top of the stack. A pan is placed at the bottom to collect material that passes through the sieve with the smallest openings. A 40 to 60 g or greater representative portion of the sample is weighed out to the nearest 0.01 g, and placed in the top sieve. The stack of sieves is placed on a mechanical shaker. The shaker is run for approximately 10 minutes. After shaking, the amount of material retained on each sieve and in the pan is determined to the nearest 0.01 g. The distribution of sample among the sieves and the pan is reported as a percentage of the total sample sieved. The distribution is tabulated versus the size of the opening in the sieve screen. Mean particle size is calculated according to ASTM D 1921-96 §13.

The size range is defined as the range between the sieve opening through which the minicubes pass and the sieve opening through which the minicubes do not pass. For example, if, following the sieving procedure of ASTM D 1921, 80% by weight of a representative sample of a lot of minicubes were found to pass through a sieve with openings of 1200 $\mu$m and to be retained on a sieve with openings of 200 $\mu$m, one would say that 80 wt. % of that lot of minicubes is in the size range of 200 to 1200 $\mu$m.

Melt flow rates (MFR) are determined by ASTM D 1238-52T modified as described in U.S. Pat. No. 4,380,618.

MFR is reported in units of g/10 minutes. Temperature is 372° C. for perfluoropolymers, 297° C. for ETFE polymer.

EXAMPLES

Example 1

Three lots of TFE/PAVE copolymer are extruded through a 700 hole die, each hole being 31 mils (790 μm) in diameter, and cut to length to make minicube of the present invention, and the size distribution of the minicube produced is determined. For comparison, the size distribution of TFE/PAVE rotomolding powder (Teflon® TE-9738, DuPont, Wilmington Del. USA) is also determined

TABLE 1

| Sieve No. | Size (μm) | Minicube #1 TE-9738 extruded as minicube | Minicube #2 TE-5547 TE-5594 | Minicube #3 PFA 345 (fluorinated) | Rotomolding powder TE-9738 |
|---|---|---|---|---|---|
| 14 | 1400 | 0.2 | 0.2 | 0.2 | not used |
| 16 | 1180 | 2.9 | 2.0 | 1.2 | not used |
| 18 | 1000 | 37.8 | 28.9 | 11.2 | not used |
| 20 | 850 | 47.7 | 54.7 | 59.3 | 0.6 |
| 30 | 600 | 7.1 | 10.7 | 21.9 | 8.8 |
| 35 | 500 | 1.7 | 1.4 | 2.5 | 7.8 |
| 40 | 425 | not used | not used | not used | 6.0 |
| 45 | 355 | not used | not used | not used | 16.3 |
| 50 | 300 | not used | not used | not used | 17.5 |
| Pan | | 2.5 | 2.2 | 3.7 | 43.1 |
| Mean particle size (μm) | | 1063 | 960 | 890 | 300 |
| Size Range (μm) containing ≧80 wt. % of minicubes | | 850–1180 | 850–1180 | 600–1000 | <500 |

Table 1 polymers are Teflon® grades, made by DuPont, Wilmington Del. USA. Minicubes were extruded from the indicated polymers. Minicube #2 was made from a blend of the indicated grades. This example shows that size of the minicubes is substantially greater than that of commercial TFE/PAVE rotomolding powder, which is made by particle agglomeration.

Example 2

Three more lots of minicubes are prepared by extrusion of Teflon® PFA HP Plus using the die of Example 1 and cutting, and classified using sieves as summarized in the following tables. Minicubes retained on each sieve are sampled and their diameter and length is measured with the aid of a microscope, and averaged. It is seen in the following tables that the 90% or more (by weight) are about 800 to about 1100 μm in diameter and about 900 to about 1250 μm in length.

TABLE 2A

PFA Minicube Lot # 1

| Sieve | Opening μm | Distribution % | Diameter mean(μm) | Length mean(μm) |
|---|---|---|---|---|
| 16 | 1180 | 1.2 | | |
| 30 | 600 | 96.5 | 855 | 1195 |
| 60 | 250 | 2.1 | 607 | 1094 |
| Pan | — | 0.2 | 139 | 710 |
| Mean particle size (μm) | | 860 | | |
| Size Range (μm) containing ≧80 wt. % of minicubes | | 600–1180 | | |

TABLE 2B

PFA Minicube Lot # 2

| Sieve | Opening μm | Distribution % | Diameter mean(μm) | Length mean(μm) |
|---|---|---|---|---|
| 16 | 1180 | 0.2 | | |
| 30 | 600 | 98.3 | 999 | 1133 |
| 60 | 250 | 1.3 | 589 | 898 |
| Pan | — | 0.2 | 151 | 560 |
| Mean particle size (μm) | | 855 | | |
| Size Range (μm) containing ≧80 wt. % of minicubes | | 600–1180 | | |

TABLE 2C

PFA Minicube Lot # 3

| Sieve | Opening μm | Distribution % | Diameter mean(μm) | Length mean(μm) |
|---|---|---|---|---|
| 16 | 1180 | 0.8 | | |
| 30 | 600 | 87.7 | 870 | 1060 |
| 60 | 250 | 11.2 | 521 | 842 |
| Pan | — | 0.4 | 200 | 579 |
| Mean particle size (μm) | | 830 | | |
| Size Range (μm) containing ≧80 wt. % of minicubes | | 600–1180 | | |

Example 3

Although the diameters of minicubes and standard cubes intended for melt extrusion are different from one another, the diameters of each are fairly uniform, as expected in view of the uniformity of the holes in the die. Minicube diameter is about 1000 μm. Standard cube diameter is about 3000 to 4000 μm. However, it is observed that the minicubes show greater variability in length than do the standard cubes. Because of the small diameter of the minicubes, small changes in extrudate volume manifest themselves as large changes in extrudate length. Measurements are made of the lengths of standard cube (Teflon® PFA 350, available form the DuPont Company, Wilmington Del. USA) and of minicube made according to this invention. Table 2 summarizes the results.

TABLE 3

| Measurement | Minicube Length (mm) | Standard Cube Length (mm) |
|---|---|---|
| 1 | 3 | 2 |
| 2 | 3 | 2 |
| 3 | 2 | 1 |

TABLE 3-continued

| Measurement | Minicube Length (mm) | Standard Cube Length (mm) |
|---|---|---|
| 4 | 1 | 2 |
| 5 | 1 | 1.5 |
| 6 | 1 | 1.5 |
| 7 | 1.5 | — |
| 8 | 1 | — |
| 9 | 2 | — |
| Average | 1.72 | 1.67 |
| Stnd. Dev. | 0.83 | 0.41 |
| Coeff. Var. | 48% | 24% |

It is seen that the variability of the minicubes, estimated from the coefficient of variation (coefficient of variation (%)=100×(standard deviation/mean) is twice that of standard cubes. This variability is found to be beneficial in rotomolding, and this is believed to be the case because of improved packing of the minicubes on the surface of the mold.

Example 4

In this example, tetrafluoroethylene/perfluoro(propyl vinyl ether) (TFE/PPVE) copolymer containing about 3.5 wt % PPVE comonomer and having a MFR 8.5 is used. The minicubes used are about 80 wt. % in the size range 200 to 1200 μm. The minicubes are fluorinated according to U.S. Pat. No. 4,743,658 and the resulting unstable end group concentration is found to be less than 10 per million carbon atoms in the polymer. A measured amount of the minicubes is placed in the cavity of a rotomolding mold, and the mold is closed. The mold makes a cylindrical tank of about 2.5 liters volume, with a hole in the top. The mold is mounted on a rotomolding machine and biaxial rotation is begun. The machine moves the rotating mold into an oven, where it is heated and held at a temperature and time that are related to the type of mold being used. For a simple mold about 350° C. and about 1 to 1.5 hrs is sufficient known with a polymer of the type used in this example. It is known in the art that time and temperature are related and that lower temperatures can be used if longer time is allowed. The mold is removed from the oven and allowed to cool, during which time rotation continues. When cooling is complete, rotation is stopped, the mold is removed from the machine, opened, and the molded part is taken out. On examination the molded article is found to have a smooth surface, uniform cross-section, and to be free of bubbles, voids, and pores.

Example 5–8

Example 4 is repeated using four lots of minicube TFE/PEVE copolymer having about 7 wt % PEVE and melt flows of about 8.5, 16, 18, and 23, respectively. The minicubes used are about 80 wt. % in the size range 200 to 1200 μm. Minicubes of this example are fluorinated according to U.S. Pat. No. 4,743,658 and the resulting unstable end group concentration is found to be less than 10 per million carbon atoms in the polymer. As the MFR increases, shorter times and lower temperatures suffice to make good rotomolded articles. The rotomolded articles on examination are found to have smooth surfaces and to be free of bubbles, voids, and pores.

What is claimed is:

1. Melt extruded cubes of melt-fabricable TFE copolymer having no greater than about 80 unstable end groups per $10^6$ carbon atoms, at least about 80 weight % of said cubes being in the size range of about 200 to about 1200 μm.

2. Process comprising rotomolding melt-extruded cubes, said melt-extruded cubes comprising melt-fabricable tetrafluoroethylene copolymer having no greater than about 80 unstable end groups per $10^6$ carbon atoms, at least about 80 weight % of said cubes being in the range of about 200 to about 1200 μm, to form a hollow article of said copolymer.

3. The process of claim 2 wherein at least about 80 weight % of said melt extruded cubes are in the size range of about 500 μm to about 1200 μm.

4. The process of claim 3 wherein said melt-fabricable fluoropolymer is TFE/PAVE copolymer.

5. The process of claim 4 wherein the TFE/PAVE copolymer is selected from the group consisting of TFE/PEVE copolymer and TFE/PPVE copolymer.

6. The process of claim 2 wherein the melt-extruded cubes have a coefficient of variation of at least about 25% in one measurement selected from the group consisting of weight, length, width, and height.

7. The process of claim 2 wherein the said melt extruded cubes have a concentration of unstable end groups not exceeding about 10 per million carbon atoms in the polymer.

8. The process of claim 4 wherein the PAVE content of the copolymer is at least about 3 wt %.

* * * * *